Nov. 2, 1948.                W. F. BENNING                2,452,981
                    COMBINED THROTTLE AND BRAKE PEDAL
Filed Dec. 30, 1944                                 2 Sheets-Sheet 1
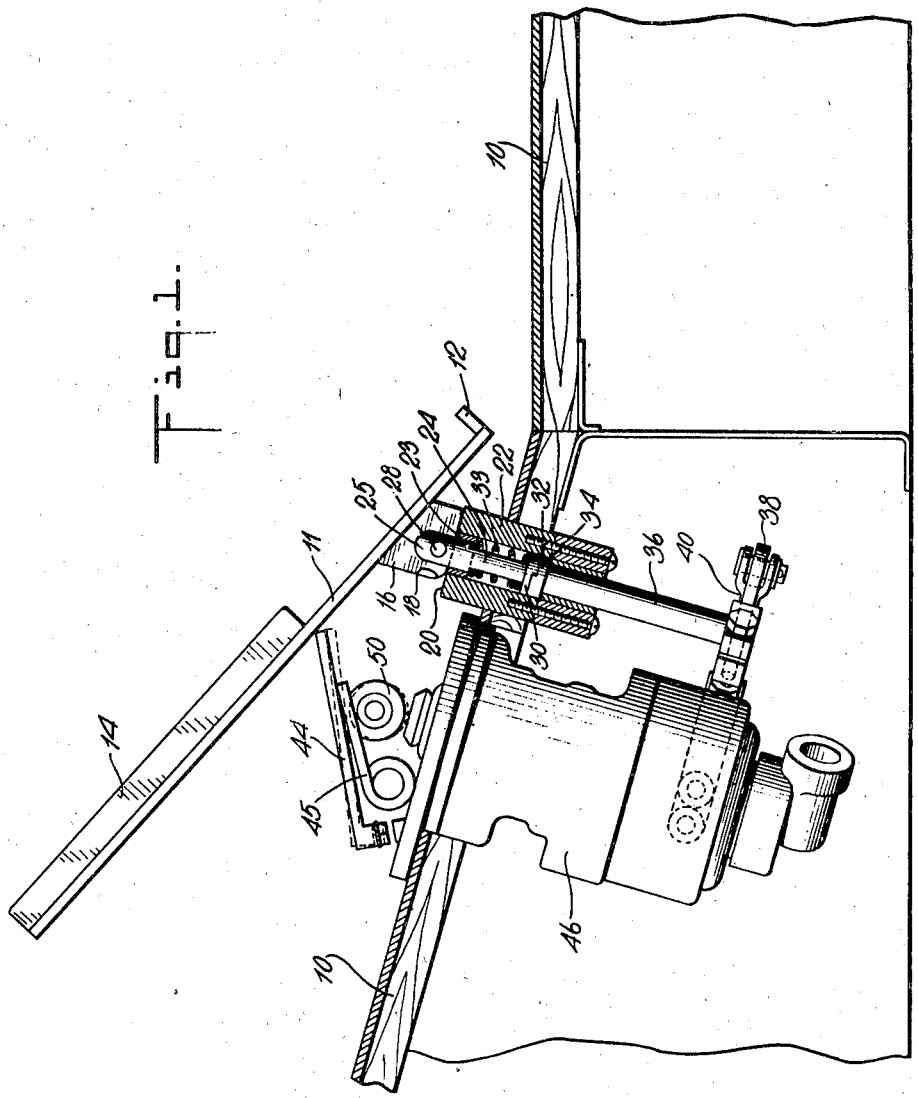
INVENTOR
WALTER F. BENNING
BY
ATTORNEYS Nov. 2, 1948.　　　　W. F. BENNING　　　　2,452,981
COMBINED THROTTLE AND BRAKE PEDAL
Filed Dec. 30, 1944　　　　2 Sheets-Sheet 2
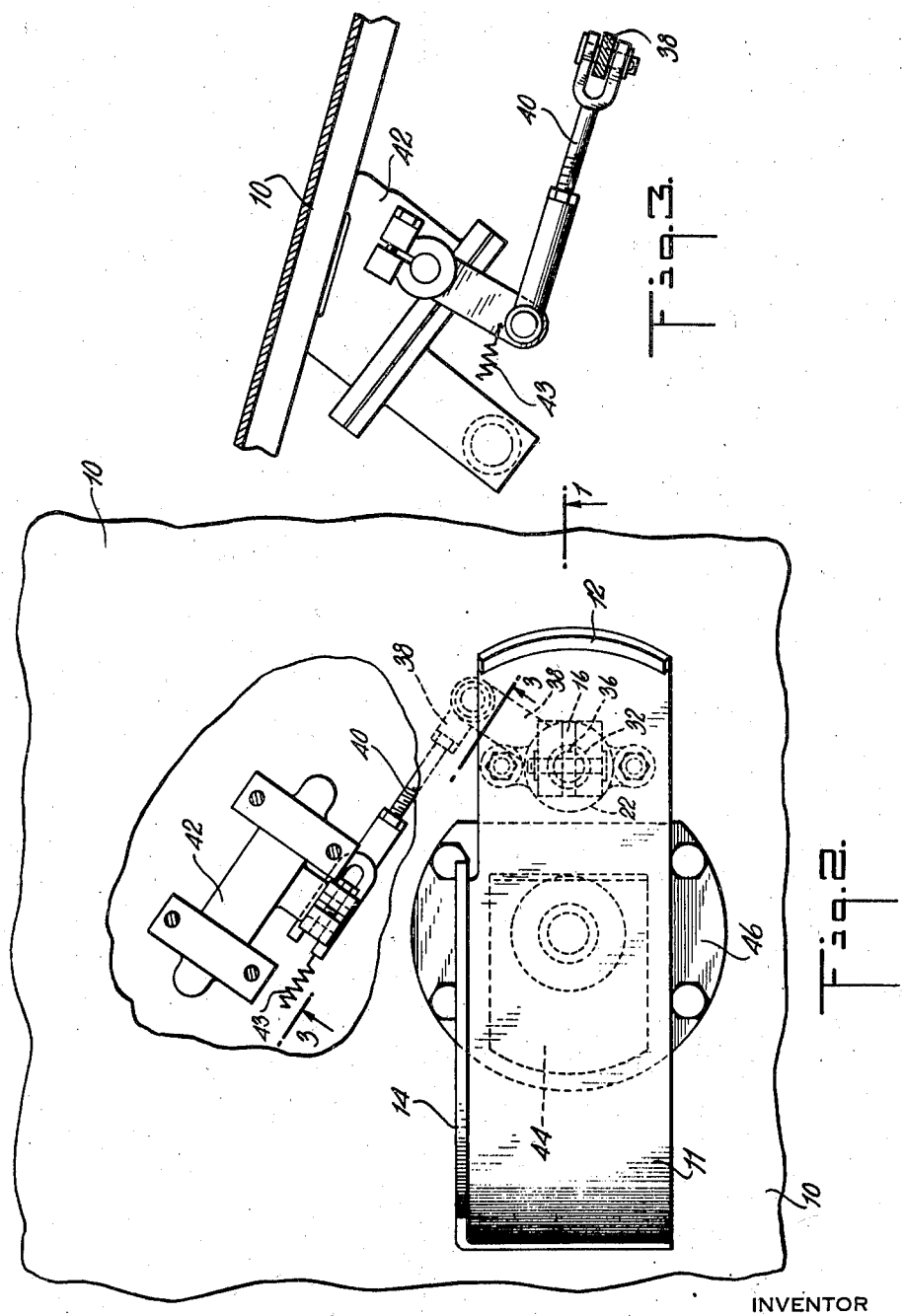
INVENTOR
WALTER F. BENNING
BY
*Hoguet, Neary & Campbell*
his ATTORNEYS Patented Nov. 2, 1948

2,452,981

UNITED STATES PATENT OFFICE 2,452,981

COMBINED THROTTLE AND BRAKE PEDAL

Walter F. Benning, Toledo, Ohio, assignor to Mack Manufacturing Corporation, New York, N. Y., a corporation of Delaware Application December 30, 1944, Serial No. 570,702

14 Claims. (Cl. 192—3)

1

This invention relates to an improved pedal control for power and brake systems and more particularly, to a single, dual-control accelerator and brake pedal for use with automotive vehicles.

For years automotive vehicles have been built with separate foot-operated brake and accelerator pedals. To actuate such pedals, it is necessary for the operator to remove his foot from one pedal and to transfer it to the other pedal. In an emergency, this conventional arrangement is not conducive to the rapid application of the brake, and various proposals have been made to combine the accelerator and brake pedals into a single unit for ease and quickness of operation. Many of the combined brake and accelerator pedals heretofore proposed require the operator to place or hold his foot in unnatural positions for protracted periods of time, thereby causing rapid fatigue. Most of the known combined pedals are not adapted for heavy duty service such as in buses, trucks, tractors, tanks and the like, where such vehicle is repeatedly stopped and started during normal use.

An object of the present invention is to avoid the above-mentioned disadvantages and to provide a safe, dual-control pedal for use with automotive vehicles of all types, which enables the operator to exercise closer and easier control over the vehicle.

Another object is to provide an improved combined accelerator and brake pedal which permits the operator's foot to remain in a natural position at all times, thereby reducing fatigue to a minimum.

Another object of the invention is to provide a combined brake and accelerator foot pedal for automotive vehicles which permits the instantaneous actuation of the brake mechanism in any given position of the combined pedal.

A further object is to provide a combined brake and accelerator pedal adapted to be pivoted for movements both in a direction substantially normal to and parallel with the floor of the vehicle, movement in the normal direction at any position of the pedal being adapted to control the brake, and movement substantially parallel to the floor of the vehicle being adapted to control the accelerator.

These and other objects will be apparent from the following description taken together with the accompanying drawings, which illustrate a preferred embodiment of the invention, and in which:

Figure 1 is an elevational view of a section taken along the line 1—1 of Figure 2;

2

Figure 2 is a plan view, with a portion of the floor board of the vehicle broken away, illustrating the combined accelerator and brake pedal, and Figure 3 is a sectional view of a portion of the accelerator mechanism taken along the line 3—3 of Figure 2.

In general, the combined accelerator and brake control pedal illustrated is adapted to be operated by the right foot of the operator; it is located in the conventional position in front of and below the operator's seat upon the floor board 10 and comprises a foot treadle 11 having upturned edge portions 12 and 14 for engagement with the heel and right side, respectively, of the operator's foot. On the under side of the treadle, and preferably formed integrally therewith, there is provided a lug 16 having a rounded edge portion 18 on its horizontal face adapted to pivot on an annular edge portion 20 of a treadle supporting collar 22. The annular edge 20 of the treadle supporting collar 22 provides a horizontal face for engagement by the horizontal face provided by the lower edge of the lug 16 on the under side of the treadle 14. A clevis member 24 is rotatable within the collar 22 and is pivotally secured at its upper end 26 to lug 16 by a pin 28. The supporting collar 22 is suitably secured to the floor of the vehicle and together with bushing 23 provides a journal to permit the treadle 14 to be moved or rotated in a direction substantially parallel to the floor of the vehicle. The lower end of clevis member 24 is secured to or integral with the upper half 30 of a rotatable jaw clutch 32, the lower half 34 of the jaw clutch being secured to or integral with shaft 36. A compression spring 33 is disposed about the shaft of clevis 24 for assisting the operation of the jaw clutch. A link member 38 is fixed to the lower end of shaft 36 and interconnects through a connecting rod mechanism 40 to a conventional accelerator device shown generally at 42 which is urged to a normal idling or home position by retractor spring 43.

There is also provided on the under side of the treadle 11 a spring-controlled biasing plate 44 which is disposed slightly in advance of the collar 22, and the spring 45 of which is adapted to normally urge the treadle member 11 upward to its normal brake-inoperative or home position, shown in Figure 1. A conventional master brake operating valve mechanism 46 is disposed directly beneath the biasing plate 44 and is adapted to be actuated by contact member 50 disposed between the biasing plate and the brake mechanism.

The mode of operation of the combined accelerator and brake control pedal is as follows. Assuming the vehicle to be at rest with the motor operating at idling speed and it is desired to put the vehicle in motion, the operator engages the motor with the wheel driving mechanism in any conventional manner. The operator then places his foot on the treadle 11 and imparts to it an angular rotary motion in a clockwise direction about the longitudinal axis of shaft 36. The rotation of the treadle 11 in a clockwise direction rotates the shaft 36 and pulls the lever arm 38 secured thereto backward in a clockwise direction. This movement exerts a rearward pull upon the connecting rod 40 against the tension of spring 43, thereby increasing the amount of the fuel-air mixture to the motor and hence, the speed of the vehicle. Conversely, moving the treadle 11 in a counterclockwise direction decreases the speed of the vehicle by permitting the accelerator connecting rod mechanism 40 to return toward the idling position of the motor and hence, to decrease the fuel flow.

The brake control to the motor is achieved as follows: By pressing the forward end of the treadle 11 in a downward direction, the front edge of lug 16 pivots on the ledge 20 of collar 22 and tilts the spring-biased plate 44 against the contact member 50 to engage the brake actuating valve or mechanism 46. Continued downward movement of the treadle 11 not only increases the pressure upon the brakes, but causes the clevis member 24 to move upward and to lift the upper half 30 of the clutch jaw 32 out of engagement with the lower half of the clutch 32, whereby the shaft 36 is free to rotate about its axis and thus no longer opposes the pull of spring 43 through members 38 and 40. In this manner, the accelerator mechanism is automatically and instantaneously pulled to an idling position by retractor spring 43, thus permitting the motor to act as an additional brake.

It will be seen that by virtue of this construction and operation of the combined pedal, that the foot of the operator need not be moved at all to actuate the brake or accelerator of the vehicle, but that both brake and accelerator may be rapidly and effectively controlled by one pedal and irrespective of the angular position of the pedal, thereby insuring both greater speed and ease of control and thus contributing to the safety of operation of the vehicle.

It will be understood that in the disclosure described above, various modifications may be made without affecting the principle of the invention; further, that the invention is not to be considered as limited to the embodiment which is described herein only for purposes of illustration, but solely by the terms of the appended claims.

I claim:

1. A dual-control foot accelerator and brake pedal associated with the floor of an automotive vehicle, comprising a pedal, means for supporting and pivoting said pedal in a direction toward and away from the floor of said vehicle, rotatable shaft means interconnected with said supporting means for pivoting said pedal in a direction substantially parallel to the floor of said vehicle, clutch means interconnecting said shaft to an accelerator mechanism, said clutch being constructed and arranged to be disengaged by the pivoting movement of said pedal in the direction toward said floor irrespective of the relative position of said pedal.

2. Dual-control foot pedal, according to claim 1, comprising means to throttle the fuel supply to the motor of said vehicle, said means being operative instantly upon the disengagement of said clutch.

3. Dual-control foot accelerator and brake pedal, according to claim 1, wherein said clutch means is a jaw clutch which, after disengagement, is engageable again with said accelerator mechanism after said pedal is returned to a position corresponding to a normal engine idling position.

4. A dual-control foot accelerator and brake pedal associated with the floor of an automotive vehicle comprising a treadle, means for pivotally supporting said treadle for movement toward and away from the floor of said vehicle for applying the brakes, means for pivotally supporting said treadle about a vertical axis, means operated by said treadle as it is moved about said vertical axis for operating the accelerator, said last mentioned means including a clutch, and means operated by said treadle as it is moved to apply the brakes for disengaging said clutch.

5. A foot treadle pivoted on a horizontal pivot and also on a vertical pivot on the floor of a vehicle, a brake controlling element separate from the treadle and lying in the path of movement of said treadle about its horizontal pivot when in any of its positions about its vertical pivot, an accelerator actuating connection including a clutch operated by said treadle as it is moved about its vertical pivot, and means operated as an incident to the movement of said treadle about its horizontal pivot for disengaging said clutch.

6. A foot treadle for operating a brake and an accelerator, means pivotally supporting said treadle on a horizontal axis for operating the brake and on a vertical axis for operating the accelerator, a connection between said treadle and accelerator including a clutch engageable when the treadle is in normal home position about both of its pivots and means operated by movement of said treadle about its horizontal axis when said treadle is in any of its positions about said vertical axis for disengaging said clutch.

7. A treadle for applying brakes and operating an accelerator, means for supporting said treadle for rotational movement about a vertical axis and for pivoting movement about a horizontal axis, cooperating means on said treadle and supporting means for raising said treadle as it is rocked on said support in any of its rotated positions on said support for applying the brake, means for operating the accelerator by rotational movement of said treadle, said last-mentioned means including a clutch, and means operated by said treadle as it is raised for disengaging said clutch.

8. In combination with an accelerator and a brake mechanism, a dual-control means comprising a foot treadle supported for movement about vertical and horizontal axes, a support for said treadle provided with a horizontal face, and a member on said treadle having a horizontal face engaging the horizontal face on said support for rotation about the vertical axis and having an arcuate surface at the forward end of its horizontal face for pivotal engagement with the horizontal face of said support for pivotal movement about the horizontal axis.

9. In combination with an accelerator and a brake mechanism, a dual-control means comprising a foot treadle supported for movement about vertical and horizontal axes, a support for said treadle provided with a horizontal face, a member on said treadle having a horizontal face engaging the horizontal face on said support and having an arcuate surface at the forward end of its horizontal face for pivotal engagement with the horizontal face of said support, said support being provided with a vertical opening extending through its horizontal face, and means extending downwardly from said member through the horizontal face of said member and through the opening in said support for operating said accelerator.

10. In combination with an accelerator and a brake mechanism, a dual-control means comprising a foot treadle supported for movement about vertical and horizontal axes, a support for said treadle provided with a horizontal face, a member on said treadle having a horizontal face engaging the horizontal face on said support for rotation thereon and having an arcuate surface at the forward end of its horizontal face for rocking engagement with the horizontal face of said support, said support being provided with a vertical opening extending through its horizontal face, a shaft extending downwardly from said member through the opening in said support for operating said accelerator, a shiftable clutch element on said shaft, and a cooperating clutch element for operating said accelerator, said shiftable clutch element being disengaged from said cooperating clutch element by said treadle as it is rocked on the horizontal face of said support.

11. In a dual-control mechanism comprising a treadle provided with sole and heel engaging faces, a member depending from said treadle under said heel engaging face and provided with a horizontal face merging at its front end with an arcuate surface and a support for said treadle provided with a horizontal face engaged by said horizontal face of said member for rotation of said treadle about a vertical axis and adapted to be engaged by said arcuate surface for rocking movement of said treadle about a horizontal axis.

12. In a dual-control mechanism comprising a treadle provided with sole and heel engaging faces, a member depending from said treadle under said heel engaging face and provided with a horizontal face merging at its front end with an arcuate surface, a support for said treadle provided with a horizontal face engaged by said horizontal face of said member for rotation of said treadle about a vertical axis and adapted to be engaged by said arcuate surface for rocking movement of said treadle about a horizontal axis, and actuating control means including a movable clutch element connected to said member at said vertical axis.

13. In a dual-control mechanism comprising a treadle provided with sole and heel engaging faces, a member depending from said treadle under said heel engaging face and provided with a horizontal face merging at its front end with an arcuate surface, a support for said treadle provided with a horizontal face engaged by said horizontal face of said member for supporting said treadle for rotation about a vertical axis and adapted to be engaged by said arcuate surface for rocking movement of said treadle about a horizontal axis, and cooperating means on said member and said support to hold said treadle on said vertical axis.

14. In combination with an accelerator and a brake mechanism, a dual control means comprising a foot treadle, a treadle support, said treadle and treadle support having cooperating surfaces providing for rotation of said treadle about an axis substantially perpendicular to said surfaces, and pivot means on said treadle cooperating with said support surface providing for pivotal movement of said treadle about a horizontal axis located forwardly of said axis.

WALTER F. BENNING.

REFERENCES CITED

The following references are of record in the file of this patent:

UNITED STATES PATENTS

| Number | Name | Date |
| --- | --- | --- |
| 1,457,489 | Barton | June 5, 1923 |
| 1,619,421 | Hull | Mar. 1, 1927 |
| 1,718,884 | Thorpe | June 25, 1929 |
| 2,181,883 | Gibson | Dec. 5, 1939 |